(12) United States Patent
Kramer et al.

(10) Patent No.: US 8,114,519 B2
(45) Date of Patent: Feb. 14, 2012

(54) DERIVATIZED SOLID EPOXY RESIN AND USES THEREOF

(75) Inventors: Andreas Kramer, Zurich (CH); Juergen Finter, Zurich (CH)

(73) Assignee: Sika Technology AG, Baar (CH)

( * ) Notice: Subject to any disclaimer, the term of this patent is extended or adjusted under 35 U.S.C. 154(b) by 482 days.

(21) Appl. No.: 12/311,908

(22) PCT Filed: Oct. 24, 2007

(86) PCT No.: PCT/EP2007/061419
§ 371 (c)(1),
(2), (4) Date: Apr. 17, 2009

(87) PCT Pub. No.: WO2008/049860
PCT Pub. Date: May 2, 2008

(65) Prior Publication Data
US 2010/0035041 A1 Feb. 11, 2010

(30) Foreign Application Priority Data
Oct. 24, 2006 (EP) .................................... 06122866

(51) Int. Cl.
*B32B 27/38* (2006.01)
*C09J 163/00* (2006.01)
*C08J 9/04* (2006.01)
*C08G 59/14* (2006.01)
*C08L 63/00* (2006.01)

(52) U.S. Cl. ........ 428/414; 156/330; 428/413; 521/137; 521/155; 521/156; 521/178; 525/523; 525/524; 525/525; 525/526; 525/528; 528/60; 528/65; 528/66; 528/77; 528/85; 528/119; 528/121; 528/123

(58) Field of Classification Search .................. 156/330; 428/413, 414, 416, 418; 521/50, 134, 137, 521/155, 156, 178; 523/400, 427; 525/523, 525/524, 525, 526, 528, 529, 530, 533; 528/44, 528/45, 59, 60, 65, 66, 69, 76, 77, 85, 106, 528/119, 121, 123
See application file for complete search history.

(56) References Cited

U.S. PATENT DOCUMENTS

| | | | |
|---|---|---|---|
| 3,042,545 A * | 7/1962 | Kienle et al. .................. 427/386 |
| 3,424,719 A * | 1/1969 | Masters .......................... 528/73 |
| 5,194,502 A * | 3/1993 | Saito et al. .................... 525/111 |
| 5,314,971 A * | 5/1994 | Neffgen et al. ............... 525/504 |
| 5,668,227 A | 9/1997 | Wolleb et al. |
| 5,707,439 A | 1/1998 | Takekoshi et al. |
| 6,197,849 B1 | 3/2001 | Zilg et al. |
| 6,322,890 B1 | 11/2001 | Barron et al. |
| 2005/0159511 A1 | 7/2005 | Kramer |
| 2007/0066721 A1 | 3/2007 | Kramer et al. |
| 2007/0105983 A1 | 5/2007 | Kramer et al. |

FOREIGN PATENT DOCUMENTS

| | | |
|---|---|---|
| EP | 0 338 985 B1 | 5/1994 |
| JP | A-53-10652 | 1/1978 |
| WO | WO 03/093387 A1 | 11/2003 |
| WO | WO 2004/055092 A1 | 7/2004 |
| WO | WO 2005/007720 A1 | 1/2005 |
| WO | WO 2005/007766 A1 | 1/2005 |

* cited by examiner

*Primary Examiner* — Michael J Feely
(74) *Attorney, Agent, or Firm* — Oliff & Berridge, PLC

(57) ABSTRACT

Derivatized solid epoxy resins of the formula (I), which are outstandingly suitable as impact modifiers; and compositions which include such derivatized solid epoxy resins and are outstandingly suitable as one-component heat-curable adhesives, and as structural foams which have a high impact resistance and high mechanical stability.

32 Claims, No Drawings

DERIVATIZED SOLID EPOXY RESIN AND USES THEREOF

TECHNICAL FIELD

The invention relates to the field of epoxy resin compositions, and in particular to the field of impact-resistant heat-curing epoxy resin compositions and structural foams.

PRIOR ART

Impact modifiers have a long history of use for improving the strength of adhesives subject to impact forces. Epoxy resin compositions in particular generally have high mechanical strengths but are very brittle, and this means that when the cured epoxy resin is subject to an impact force, for example one arising in a vehicle collision, it fractures, and the bond is therefore destroyed.

Liquid rubbers have a relatively long history of use as tougheners. Examples of liquid rubbers used are those based on acrylonitrile/butadiene copolymers, examples being obtainable as Hycar®.

EP-B-0 338 985 describes impact-resistant epoxy resin compositions which comprise not only liquid rubbers based on acrylonitrile/butadiene copolymers but also liquid rubbers based on polyurethane prepolymers, where these have capping by a phenol or by a lactam. WO-A-2005/007766 discloses impact-resistant epoxy resin compositions which comprise a reaction product of a prepolymer capped by isocyanate groups and of a capping agent selected from the group of bisphenol, phenol, benzyl alcohol, aminophenol, or benzylamine. WO-A-03/093387 discloses impact-resistant epoxy resin compositions which comprise adducts of dicarboxylic acids with glycidyl ethers, or of bis(aminophenyl)sulfone isomers, or of aromatic alcohols, with glycidyl ethers. WO-A-2004/055092 and WO-A-2005/007720 disclose epoxy resin compositions with improved impact resistance, which comprise a reaction product of a polyurethane prepolymer terminated by isocyanate groups with a low-molecular weight monohydroxyepoxide. These epoxy resin compositions have improved low-temperature impact resistance when compared with those comprising phenol-terminated polyurethane prepolymers, but are still not ideal.

All of these abovementioned impact modifiers are high-viscosity substances, and this is disadvantageous for the production of certain formulations. Specifically, the addition of high-viscosity liquids is feasible only with increased costs when used to improve the toughness of solid epoxy systems, mostly achieved by methods involving formulation in extruders.

BRIEF DESCRIPTION OF THE INVENTION

It is therefore an object of the present invention to find novel impact modifiers which are solid at room temperature and which can firstly function as epoxy resin and can secondly bring about a marked improvement in impact resistance, and are also easy to feed.

Surprisingly, it has been found that this object can be achieved via a derivatized solid epoxy resin as claimed in claim 1.

This can be produced in a simple manner from commercially available solid resins. It has been found that these hardened derivatized solid epoxy resins have high impact resistance. This is also the case when this derivatized solid epoxy resin is added to other resins, in particular epoxy resins. The derivatized solid epoxy resins therefore increase impact resistance and can therefore be used as impact modifiers.

A further aspect of the invention relates to compositions which comprise these derivatized solid epoxy resins. They have exceptionally good mechanical properties and impact resistance. These compositions can moreover be used as single-component heat-curing adhesives, or as structural foams.

Further aspects of the invention relate to a process for the production of a solid epoxy resin thus derivatized, and to adhesive-bonded items as claimed in claim 30, and also to foamed items as claimed in claim 32. Particularly preferred embodiments are provided by the subclaims.

EMBODIMENTS OF THE INVENTION

One first aspect of the present invention relates to a derivatized solid epoxy resin of the formula (I).

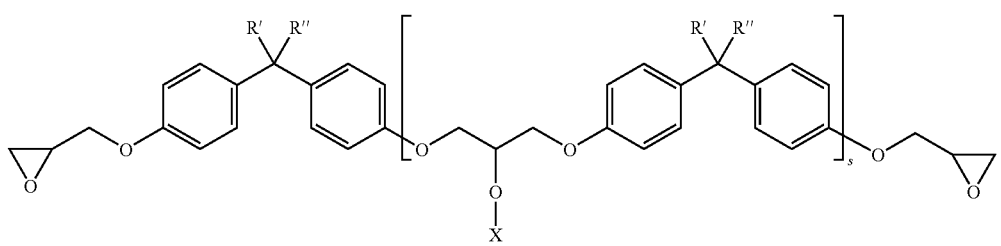

(I)

$R'$ and $R''$ here, independently of each other, are either H or $CH_3$. The term "independently of one another" or "independently of the others" in this document means, in the context of substituents, moieties, or groups, that identically designated substituents, moieties, or groups can occur simultaneously with a different meaning in the same molecule.

$s$ is moreover a value from 2 to 12.

Finally, X, independently of the others, is H or a moiety of the formula (II).

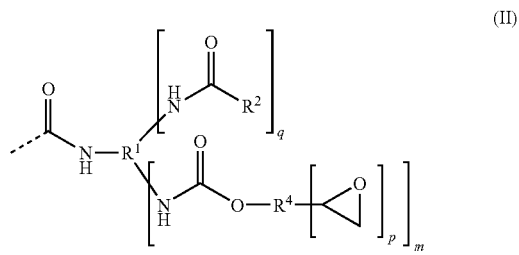

(II)

$R^4$ here is a moiety of an aliphatic, cycloaliphatic, aromatic, or araliphatic epoxide containing a primary or secondary hydroxy group, after the removal of the hydroxide and epoxide groups. Furthermore, p=1, 2 or 3, and $R^2$, independently of the others, is a capping group which cleaves at a temperature above 100° C.

$R^1$ is a linear or branched polyurethane prepolymer PU1 terminated by (m+q+1) isocyanate groups after the removal of all of the terminal isocyanate groups, and m≧0, and q≧0, with the condition that 1≦(m+q)≦8.

Finally there is the proviso that at least one X in the formula (I) is a moiety of the formula (II).

The broken lines in the formulae in this document in each case represent the bond between the respective substituent and the associated molecular moiety.

It is preferable all R' and R" are methyl.

The derivatized solid epoxy resins of the formula (I) can be obtained from the reaction of a solid epoxy resin of the formula (I') and a polyurethane prepolymer of the formula (IV) comprising an isocyanate group.

By varying the stoichiometric ratio it is possible to vary the number of the hydroxy groups consumed by the reaction. By using the stoichiometric amount or a slightly superstoichiometric amount of the isocyanate, it is possible for all the OH groups to be consumed during the reaction. However, in most cases this is not preferred. It is preferable that only a portion of the OH groups is consumed in the reaction. This means that it is preferable that formula (I) comprises not only moieties X which are H but also moieties X which are a moiety of the formula (II).

Preference is given to derivatized solid epoxy resins in which at most 90%, in particular from 10 to 80%, preferably from 10 to 50%, of all of the moieties X are a moiety of the formula (II).

$R^2$ in the formulae (II) and (IV) is preferably a moiety selected from the group consisting of

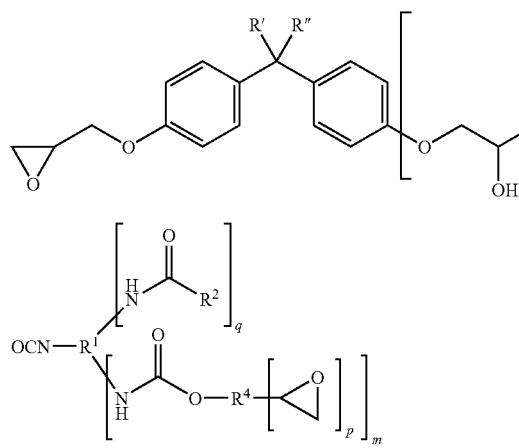

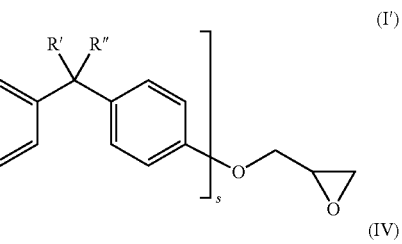

This reaction typically takes place at a temperature at which the solid epoxy resin can be liquefied, or with use of solvents, in particular in the presence of catalysts for the NCO/OH reaction. The reaction preferably takes place at a temperature above the melting point of the epoxy resin of the formula (I'). It is particularly preferable that the reaction is obtained using a compounder or an extruder, starting from the melt of the solid resin of the formula (I') and the polyurethane prepolymer of the formula (IV) comprising an isocyanate group.

Particularly suitable catalysts for the reaction of the isocyanate groups with the secondary hydroxy groups of the solid resin are the following, which are known to the person skilled in the art: salts, complexes, or organometallic compounds of transition metals, in particular of tin and bismuth. These compounds are particularly tin compounds, such as dibutyltin diacetate, dibutyltin dilaurate, dibutyltin distearate, dibutyltin diacetylacetonate, dioctyltin dilaurate, dibutyltin dichloride, and dibutyltin oxide, tin(II) carboxylates, stannoxanes, such as lauryl stannoxane, bismuth compounds, such as bismuth (III) octoate, bismuth(III) neodecanoate, or bismuth(III) oxinates. Dibutyltin dilaurate is particularly suitable.

The glass transition temperature of solid epoxy resins is above room temperature, i.e. they can be comminuted at room temperature to give free-flowing powders. Typical solid epoxy resins of this type are commercially available by way of example from Dow or Huntsman, or Hexion.

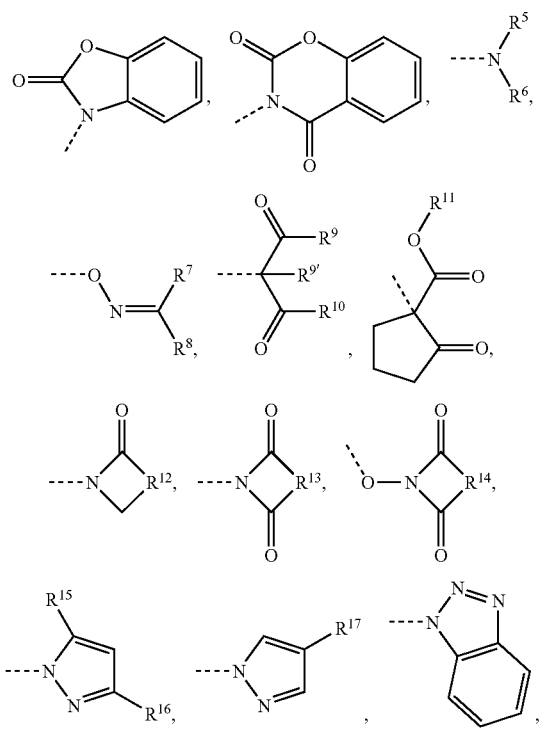

-continued

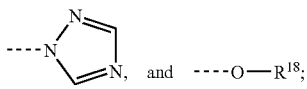

In each case $R^5$, $R^6$, $R^7$, and $R^8$ here, independently of the others, is an alkyl or cycloalkyl or aralkyl or arylalkyl group, or else $R^5$ together with $R^6$, or $R^7$ together with $R^8$, forms a portion of an optionally substituted 4- to 7-membered ring.

Furthermore, in each case $R^9$, $R^{9'}$, and $R^{10}$, independently of the others, is an alkyl or aralkyl or arylalkyl group, or is an alkyloxy or aryloxy or aralkyloxy group, and $R^{11}$ is an alkyl group.

In each case $R^{12}$, $R^{13}$, and $R^{14}$, independently of the others, is an alkylene group having from 2 to 5 carbon atoms and, if appropriate, having double bonds or substitution, or is a phenylene group, or is a hydrogenated phenylene group, and in each case $R^{15}$, $R^{16}$, and $R^{17}$, independently of the others, is H, or is an alkyl group, or is an aryl group, or is an aralkyl group.

Finally, $R^{18}$ is an aralkyl group, or is a mono- or polynuclear substituted or unsubstituted aromatic group which, if appropriate, has aromatic hydroxy groups.

Particular moieties that may be considered as $R^{18}$ are firstly phenols or polyphenols, in particular bisphenols, after removal of a hydroxy group. Preferred examples that may be mentioned of these phenols and bisphenols are in particular phenol, cresol, resorcinol, catechol, cardanol, (3-pentadecenylphenol (from cashew nut shell oil)), nonylphenol, phenols reacted with styrene or dicyclopentadiene, bisphenol A, bisphenol F and 2,2'-diallyl-bisphenol A.

Possible $R^{18}$ are secondly in particular hydroxybenzyl alcohol and benzyl alcohol after removal of a hydroxy group.

If $R^5$, $R^6$, $R^7$, $R^8$, $R^9$, $R^{9'}$, $R^{10}$, $R^{11}$, $R^{15}$, $R^{16}$, or $R^{17}$ is an alkyl group, this is in particular a linear or branched $C_1$-$C_{20}$-alkyl group.

If $R^5$, $R^6$, $R^7$, $R^8$, $R^9$, $R^{9'}$, $R^{10}$, $R^{15}$, $R^{16}$, $R^{17}$, or $R^{18}$ is an aralkyl group, this group is in particular an aromatic group bonded by way of methylene, in particular a benzyl group.

If $R^5$, $R^6$, $R^7$, $R^8$, $R^9$, $R^{9'}$, or $R^{10}$ is an alkylaryl group, this is in particular a $C_1$-$C_{20}$-alkyl group bonded by way of phenylene, examples being tolyl or xylyl.

The moieties $R^2$ are preferably the substituents of the formulae

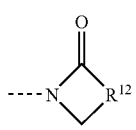

and —O—$R^{18}$. Preferred substituent of the formula

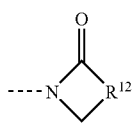

is ε-caprolactam after removal of the NH proton.

Possible particularly preferred moieties $R^2$ are monophenols or polyphenols, in particular bisphenols, after removal of a phenolic hydrogen atom. Preferred examples of these moieties $R^2$ are moieties selected from the group consisting of

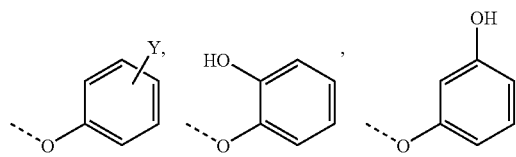

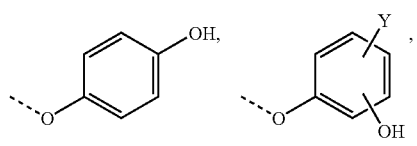

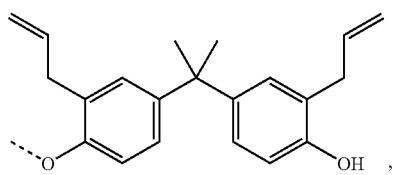

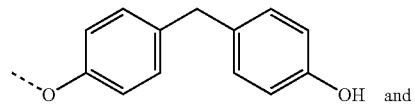

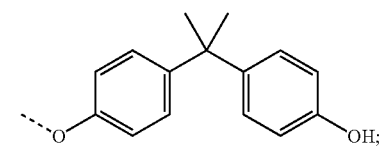

where the moiety Y is a saturated or olefinically unsaturated hydrocarbon moiety having from 1 to 20 carbon atoms, in particular having from 1 to 15 carbon atoms. Moieties preferred as Y are in particular allyl, methyl, nonyl, dodecyl, or an unsaturated C15-alkyl moiety having from 1 to 3 double bonds.

In one possible embodiment, m=0. In this case q is preferably 1.

However, it is particularly preferable that m is >0. It is further preferable that q=0. In one very preferred embodiment, m+q=1, and in a particular case m=1 and q=0. In this embodiment, the derivatized solid epoxy resin likewise has at least one epoxide group in the side chain, and this can likewise react during the crosslinking process and can therefore have a particularly advantageous effect on mechanical properties.

Preference is given in particular to a trivalent moiety of the formula

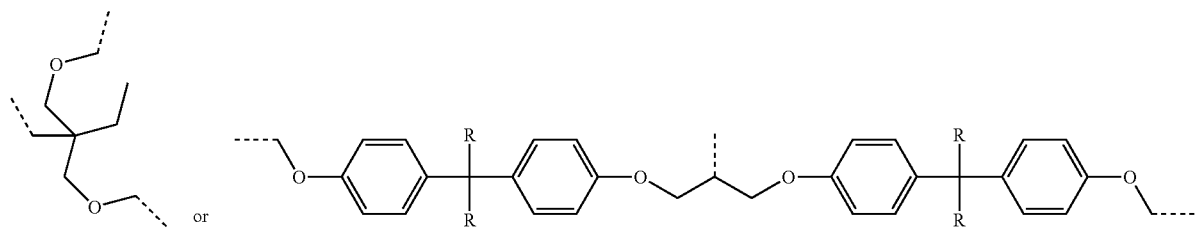

as moiety R⁴, where R is methyl or H.

It is particularly preferable that R⁴ is a moiety selected from the group consisting of butanediol monoglycidyl ether, hexanediol monoglycidyl ether, trimethylolpropane diglycidyl ether, glycerol diglycidyl ether, pentaerythritol triglycidyl ether, glycidol, 3-glycidyloxybenzyl alcohol, hydroxymethyl-cyclohexene oxide, and 1,3-bis(4-(2-(4-oxiran-2-yl-methoxy)phenyl)propan-2-yl)phenoxy)propan-2-ol) after removal of all of the OH and epoxide groups.

The method of production of the derivatized solid epoxy resin is that, in a first step, a partially capped polyurethane prepolymer of the formula (IV) is produced, which is formed from the linear or branched polyurethane prepolymer PU1 terminated by isocyanate groups and the compound R²H and/or a compound of the formula (V).

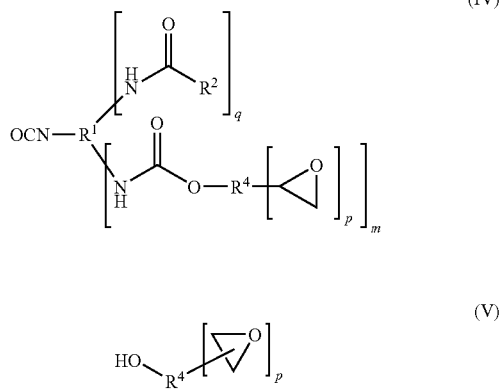

In a second step, this intermediate product of the formula (IV) containing NCO groups is then reacted with a solid resin of the formula (I') to give the derivatized solid epoxy resin of the formula (I).

If a plurality of these isocyanate-reactive compounds of the formula R²H and/or of the formula (V) are used, the reaction can take place sequentially or with a mixture of said compounds.

In an advantageous method for the reaction, the amount used of the one or more isocyanate-reactive compounds is slightly substoichiometric, based on the NCO groups. This ensures that the reaction product has a maximum proportion of the polyurethane prepolymer of the formula (IV) having one NCO group. If the proportion of the polyurethane prepolymers which, after the reaction, have more than one isocyanate group is excessive, the reaction with the solid epoxy resin gives an undesirably great viscosity increase, for example gelling. If the proportion of the polyurethane prepolymers which, after the reaction, have no residual free isocyanate group is excessive, there are many of these reaction products present which do not react with the solid resin.

The monohydroxyepoxide compound of the formula (V) has 1, 2, or 3 epoxide groups. The hydroxy group of this monohydroxyepoxide compound (V) can be a primary or secondary hydroxy group.

These monohydroxyepoxide compounds can by way of example be produced via reaction of polyols with epichlorohydrin. As a function of the conduct of the reaction of polyhydric alcohols with epichlorohydrin, the corresponding monohydroxyepoxide compounds are also produced as by-products at various concentrations. These can be isolated via conventional separation operations. However, it is generally possible simply to use the product mixture obtained in the glycidylization reaction of polyols and composed of polyol reacted completely or partially to give the glycidyl ether. Examples of these hydroxylated epoxides are butanediol monoglycidyl ether (present in butanediol diglycidyl ether), hexanediol monoglycidyl ether (present in hexanediol diglycidyl ether), cyclohexanedimethanol glycidyl ether, trimethylolpropane diglycidyl ether (in the form of mixture present in trimethylolpropane triglycidyl ether), glycerol diglycidyl ether (in the form of mixture present in glycerol triglycidyl ether), pentaerythritol triglycidyl ether (in the form of mixture present in pentaerythritol tetraglycidyl ether). It is preferable to use trimethylolpropane diglycidyl ether, a relatively high proportion of which occurs in conventionally produced trimethylolpropane triglycidyl ether.

However, it is also possible to use other similar hydroxylated epoxides, in particular glycidol, 3-glycidyloxybenzyl alcohol, or hydroxymethylcyclohexene oxide. Preference is further given to the β-hydroxy ether of the formula (IX), which is present to an extent of about 15% in commercially available liquid epoxy resins produced from bisphenol A (R=CH₃) and epichlorohydrin, and also the corresponding β-hydroxy ethers of the formula (IX) which are formed during the reaction of bisphenol F (R=H) or of the mixture of bisphenol A and bisphenol F with epichlorohydrin.

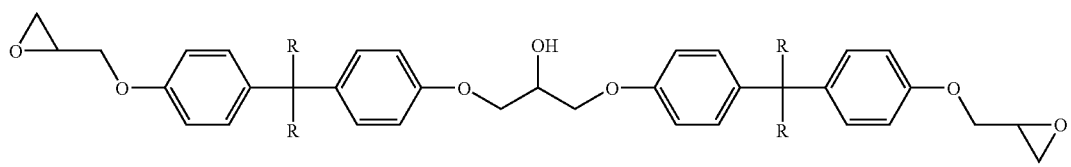

(IX)

Preference is also further given to distillation residues produced during the production of high-purity, distilled liquid epoxy resins. These distillation residues have from one to three times higher concentration of hydroxylated epoxides when compared with commercially available undistilled liquid epoxy resins. It is also possible below to use a very wide variety of epoxides having a β-hydroxy ether group, produced via the reaction of (poly)epoxides with a substoichiometric amount of monofunctional nucleophiles, such as carboxylic acids, phenols, thiols, or secondary amines.

The free primary or secondary OH-functionality of the monohydroxyepoxide compound of the corresponding formula (V) permits efficient reaction with terminal isocyanate groups of prepolymers, without any need here to use disproportionate excesses of the epoxide component.

The polyurethane prepolymer PU1 on which $R^1$ is based can be produced from at least one diisocyanate or triisocyanate, or else from a polymer $Q_{PM}$ having terminal amino, thiol, or hydroxy groups, and/or from a polyphenol $Q_{PP}$, if appropriate having substitution.

In this entire specification, the prefix syllable "poly" in "polyisocyanate", "polyol", "polyphenol", and "polymercaptan" designates molecules which formally contain two or more of the respective functional groups.

Suitable diisocyanates are aliphatic, cycloaliphatic, aromatic, or araliphatic diisocyanates, in particular commercially available products, such as methylene-diphenyl diisocyanate (MDI), hexamethylene diisocyanate (HDI), toluene diisocyanate (TDI), tolidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, naphthalene 1,5-diisocyanate (NDI), dicyclohexylmethyl diisocyanate ($H_{12}$MDI), p-phenylene diisocyanate (PPDI), m-tetramethylxylylene diisocyanate (TMXDI), etc., and also their dimers. Preference is given to HDI, IPDI, MDI or TDI.

Suitable triisocyanates are trimers or biurets of aliphatic, cycloaliphatic, aromatic, or araliphatic diisocyanates, in particular the isocyanurates and biurets of the diisocyanates described in the previous paragraph.

It is, of course, also possible to use suitable mixtures of di- or triisocyanates.

Particularly suitable polymers $Q_{PM}$ having terminal amino, thiol, or hydroxy groups are polymers $Q_{PM}$ having two or three terminal amino, thiol, or hydroxy groups.

The polymers $Q_{PM}$ advantageously have an equivalent weight of from 300 to 6000, in particular from 600 to 4000, preferably from 700 to 2200, g/equivalent of NCO-reactive groups.

Suitable polymers $Q_{PM}$ are polyols, such as the following commercially available polyols, or any desired mixtures thereof:

polyoxyalkylene polyols, also termed polyether polyols, where these are the polymerization product of ethylene oxide, propylene 1,2-oxide, butylene 1,2- or 2,3-oxide, tetrahydrofuran, or a mixture thereof, if appropriate polymerized with the aid of a starter molecule having two or three active H atoms, examples being water or compounds having two or three OH groups. The materials used can either be polyoxyalkylene polyols which have a low degree of unsaturation (measured according to ASTM D2849-69 and stated in milliequivalent of unsaturation per gram of polyol (meq/g)), produced by way of example with the aid of what are known as double metal cyanide complex catalysts (abbreviated to DMC catalysts), or else polyoxyalkylene polyols having a higher degree of unsaturation, produced by way of example with the aid of anionic catalysts, such as NaOH, KOH, or alkali metal alcoholates. Particularly suitable materials are polyoxypropylenediols and -triols having a degree of unsaturation below 0.02 meq/g and having a molecular weight in the range from 1000 to 30 000 daltons, polyoxybutylenediols and -triols, polyoxypropylenediols and -triols having a molecular weight of from 400 to 8000 daltons, and also the materials termed "EO-endcapped" (ethylene-oxide-endcapped) polyoxypropylenediols or -triols. The latter are specific polyoxypropylene polyoxyethylene polyols obtained by, for example, using ethylene oxide to alkoxylate pure polyoxypropylene polyols after conclusion of the polypropoxylation reaction, so that the products have primary hydroxy groups;

hydroxy-terminated polybutadiene polyols, such as those produced via polymerization of 1,3-butadiene and allyl alcohol or via oxidation of polybutadiene, and also their hydrogenation products;

styrene-acrylonitrile-grafted polyether polyols, such as those supplied as Lupranol® by Elastogran;

polyhydroxy-terminated acrylonitrile/butadiene copolymers such as those obtainable from carboxy-terminated acrylonitrile/butadiene copolymers (available commercially as Hycar® CTBN from Nanoresins AG, Germany) and from epoxides or amino alcohols;

polyester polyols produced by way of example from di- to trihydric alcohols, such as 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane, or a mixture of the abovementioned alcohols, using organic dicarboxylic acids or their anhydrides or esters, examples being succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or a mixture of the abovementioned acids, and also polyester polyols derived from lactones, such as ε-caprolactone;

polycarbonate polyols, such as those obtainable via reaction, for example, of the abovementioned alcohols—used in the structure of the polyester polyols—with dialkyl carbonates, with diaryl carbonates, or with phosgene.

The polymers $Q_{PM}$ are advantageously at least dihydric polyols having OH-equivalent weights of from 300 to 6000 g/OH-equivalent, in particular from 600 to 4000 g/OH-equivalent, preferably from 700 to 2200 g/OH-equivalent. Further advantageous polyols are those selected from the group consisting of polyethylene glycols, polypropylene glycols, polyethylene glycol-polypropylene glycol block copolymers, polybutylene glycols, hydroxy-terminated polybutadienes, hydroxy-terminated butadiene/acrylonitrile copolymers, hydroxy-terminated synthetic rubbers, their hydrogenation products, and mixtures of the abovementioned polyols.

Other polymers $Q_{PM}$ that can also be used are at least difunctional amino-terminated polyethylene ethers, polypropylene ethers, such as those marketed as Jeffamine® by Huntsman, polybutylene ethers, polybutadienes, butadiene/acrylonitrile copolymers such as those marketed as Hycar® ATBN by Nanoresins AG, Germany, and also other amino-terminated synthetic rubbers or mixtures of the components mentioned.

For certain applications, particularly suitable polymers $Q_{PM}$ are hydroxylated polybutadienes or polyisoprenes, or their partially or completely hydrogenated reaction products.

It is moreover possible that the polymers $Q_{PM}$ can also have been chain-extended, in the manner known to the person skilled in the art, via the reaction of polyamines, polyols, and polyisocyanates, in particular of diamines, diols, and diisocyanates.

Taking the example of a diisocyanate and a diol, the product is, as shown below, as a function of the selected stoichiometry, a species of the formula (VI) or (VII)

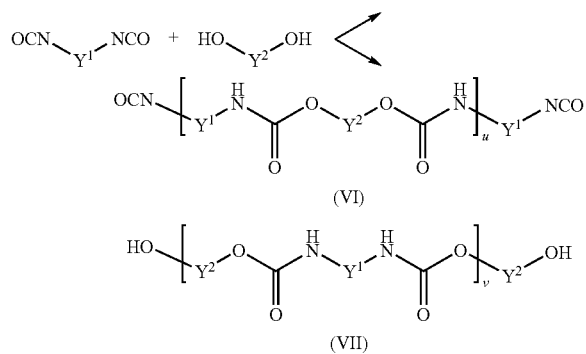

The moieties $Y^1$ and $Y^2$ are a divalent organic moiety, and the indices u and v vary from 1 to, typically, 5 as a function of the stoichiometric ratio.

These species of the formula (VI) or (VII) can then in turn be further reacted. By way of example, a chain-extended polyurethane prepolymer PU1 of the following formula can be formed from the species of the formula (VI) and from a diol using a divalent organic moiety $Y^3$.

The indices x and y vary from 1 to, typically, 5 as a function of the stoichiometric ratio, and in particular are 1 or 2.

The species of the formula (VI) can moreover also be reacted with the species of the formula (VII), thus producing a chain-extended polyurethane prepolymer PU1 having NCO groups.

For the chain extension reaction, particular preference is given to diols and/or diamines and diisocyanates. The person skilled in the art is, of course, aware that it is also possible to use higher-functionality polyols, such as trimethylolpropane or pentaerythritol, or higher-functionality polyisocyanates, such as isocyanurates of diisocyanates, for the chain extension reaction.

In the case of the polyurethane prepolymers PU1 generally, and in the case of the chain-extended polyurethane prepolymers specifically, it is advantageous to ensure that the prepolymers do not have excessive viscosities, particularly if higher-functionality compounds are used for the chain extension reaction, because this can create difficulties in their reaction to give the polymers of the formula (I), or in the application of the composition.

Preferred polymers $Q_{PM}$ are polyols having molecular weights of from 600 to 6000 daltons, selected from the group consisting of polyethylene glycols, polypropylene glycols, polyethylene glycol-polypropylene glycol block polymers, polybutylene glycols, hydroxy-terminated polybutadienes, hydroxy-terminated butadiene-acrylonitrile copolymers, and also their mixtures.

Particularly preferred polymers $Q_{PM}$ are $\alpha,\omega$-dihydroxy-polyalkylene glycols having $C_2$-$C_6$-alkylene groups or having mixed $C_2$-$C_6$-alkylene groups, and having termination by amino, thiol, or, preferably, hydroxy groups. Particular preference is given to polypropylene glycols or polybutylene glycols. Particular preference is further given to polyoxybutylenes terminated by hydroxy groups.

Bis-, tris-, and tetraphenols are particularly suitable as polyphenol $Q_{PP}$. This not only means unsubstituted phenols but also, if appropriate, means substituted phenols. The nature of the substitution can be very varied. This in particular means substitution directly on the aromatic ring bonded to the phenolic OH group. Phenols here are moreover not only mononuclear aromatics but are also polynuclear or condensed aromatics or heteroaromatics, which have the phenolic OH group directly on the aromatic or heteroaromatic system.

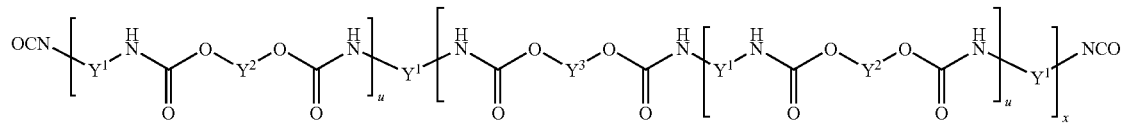

A chain-extended polyurethane prepolymer PU1 of the following formula can be formed from the species of the formula (VII) and from a diisocyanate using a divalent organic moiety $Y^4$:

The nature and position of this type of substituent is one of the factors influencing the reaction with isocyanates necessary for the formation of the polyurethane prepolymer PU1.

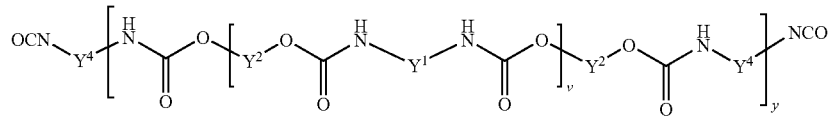

The bis- and trisphenols are particularly suitable. Examples of suitable bisphenols or trisphenols are 1,4-dihydroxybenzene, 1,3-dihydroxybenzene, 1,2-dihydroxybenzene, 1,3-dihydroxytoluene, 3,5-dihydroxybenzoates, 2,2-bis(4-hydroxyphenyl)propane (=bisphenol A), bis(4-hydroxyphenyl)methane (=bisphenol F), bis(4-hydroxyphenyl) sulfone (=bisphenol S), naphthoresorcinol, dihydroxynaphthalene, dihydroxyanthraquinone, dihydroxybiphenyl, 3,3-bis(p-hydroxyphenyl)phthalides, 5,5-bis(4-hydroxyphenyl)hexahydro-4,7-methanoindane, phenolphthaleine, fluorescein, 4,4'-[bis(hydroxyphenyl)-1,3-phenylenebis(1-methyl-ethylidene)] (=bisphenol M), 4,4'-[bis(hydroxyphenyl)-1,4-phenylenebis(1-methylethylidene)] (=bisphenol P), 2,2'-diallylbisphenol A, diphenols and dicresols produced via reaction of phenols or of cresols with diisopropylidenebenzene, phloroglucinol, gallic esters, phenol novolac, respectively, cresol novolac having OH-functionality of from 2.0 to 3.5, and also all of the isomers of the abovementioned compounds.

Preferred diphenols and dicresols produced via reaction of phenols or cresols with diisopropylidenebenzene have the type of chemical structural formula shown accordingly below for cresol as example:

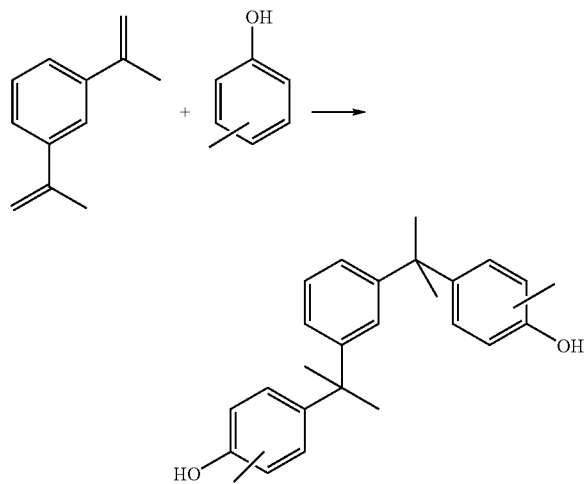

Particular preference is given to low-volatility bisphenols. Most preference is given to bisphenol M, bisphenol S, and 2,2'-diallylbisphenol A.

The $Q_{PP}$ preferably has 2 or 3 phenolic groups.

In one first embodiment, the polyurethane prepolymer PU1 is produced from at least one diisocyanate or triisocyanate, and also from a polymer $Q_{PM}$ having terminal amino, thiol, or hydroxy groups. The polyurethane prepolymer PU1 is produced in a manner known to the person skilled in the art of polyurethanes, in particular by using the diisocyanate or triisocyanate in a stoichiometric excess, based on the amino, thiol, or hydroxy groups of the polymer $Q_{PM}$.

In a second embodiment, the polyurethane prepolymer PU1 is produced from at least one diisocyanate or triisocyanate and also from a polyphenol $Q_{PP}$, which, if appropriate, has substitution. The polyurethane prepolymer PU1 is produced in a manner known to the person skilled in the art of polyurethanes, in particular by using the diisocyanate or triisocyanate in a stoichiometric excess, based on the phenolic groups of the polyphenol $Q_{PP}$.

In a third embodiment, the polyurethane prepolymer PU1 is produced from at least one diisocyanate or triisocyanate, and also from a polymer $Q_{PM}$ having terminal amino, thiol, or hydroxy groups, and also from a polyphenol $Q_{PP}$ which, if appropriate, has substitution. Various possibilities are available for production of the polyurethane prepolymer PU1 from at least one diisocyanate or triisocyanate, and also from a polymer $Q_{PM}$ having terminal amino, thiol, or hydroxy groups, and/or from a polyphenol $Q_{PP}$ which, if appropriate, has substitution.

In a first process, termed "one-pot process", a mixture of at least one polyphenol $Q_{PP}$ and of at least one polymer $Q_{PM}$ is reacted with at least one diisocyanate or triisocyanate, using an excess of isocyanate.

In a second process, termed "2-step process I", at least one polyphenol $Q_{PP}$ is reacted with at least one diisocyanate or triisocyanate, using an excess of isocyanate, and this is followed by reaction with a substoichiometric amount of at least one polymer $Q_{PM}$.

Finally, in the third process, termed "2-step process II", at least one polymer $Q_{PM}$ is reacted with at least one diisocyanate or triisocyanate, using an excess of isocyanate, and this is followed by reaction with a substoichiometric amount of at least one polyphenol $Q_{PP}$.

The three processes lead to isocyanate-terminated polyurethane prepolymers PU1 which can differ in the sequence of their units, even if they have the same constitution. All three processes are suitable, but preference is given to "2-step process II".

If the isocyanate-terminal polyurethane prepolymers PU1 described are composed of difunctional components, it was found that the polymer $Q_{PM}$/polyphenol $Q_{PP}$ equivalent ratio is preferably greater than 1.50 and that the polyisocyanate/(polyphenol $Q_{PP}$+polymer $Q_{PM}$) equivalent ratio is preferably greater than 1.20.

If the average functionality of the components used is greater than 2, the molecular-weight increase that takes place is more rapid than in the purely difunctional case. It is clear to the person skilled in the art that the limits of the possible equivalent ratios are highly dependent on whether either the selected polymer $Q_{PM}$, the polyphenol $Q_{PP}$, or the polyisocyanate, or a plurality of the components mentioned, has/have a functionality>2. Various equivalent ratios can be set; the limits of these are determined via the viscosity of the resultant polymers, and the ratios have to be determined experimentally for each individual case.

The polyurethane prepolymer PU1 preferably has elastic character; its glass transition temperature Tg is below 0° C.

The derivatized solid epoxy resin of the formula (I) is solid at room temperature and can easily be processed to give granules or flakes, crumb, powder, or beads, in particular from the molten state, and these are easy to feed.

The derivatized solid epoxy resin of the formula (I) is versatile. It can be used alone or in a composition.

The derivatized solid epoxy resin of the formula (I) can be used like a conventional solid resin. However, the impact resistances that can be obtained during the hardening of this epoxy resin are significantly higher than is the case using conventional epoxy resins.

Preference is given to compositions which comprise this derivatized solid epoxy resin in particular in a proportion of from 5 to 60% by weight, based on the weight of the composition.

In one particularly preferred embodiment, the composition comprises, in addition to a derivatized solid epoxy resin described above at least one epoxy resin A having an average of more than one epoxide group per molecule;

at least one hardener B for epoxy resins, where the hardener is activated via increased temperature.

The epoxide group of the epoxy resin A preferably takes the form of glycidyl ether group. The epoxy resin A having an average of more than one epoxide group per molecule is preferably a liquid epoxy resin or a solid epoxy resin. The possibilities for a solid resin are the same as those described above for the production of the derivatized solid epoxy resin of the formula (I).

Preferred liquid epoxy resins have the formula (XI)

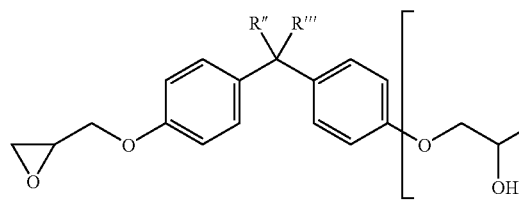
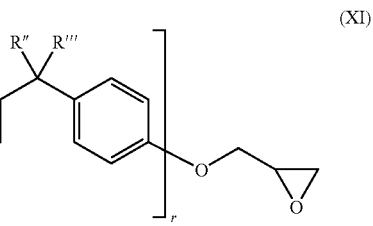

(XI)

The substituents R''' and R'''' here, independently of one another, are either H or $CH_3$. The index r moreover is a value from 0 to 1. r is preferably a value smaller than 0.2.

These materials are therefore preferably diglycidyl ethers of bisphenol A (DGEBA), of bisphenol F, or else of bisphenol A/F (where the term "A/F" here indicates a mixture of acetone with formaldehyde used as starting material in the production of this material). Liquid resins of this type are available by way of example in the form of Araldite® GY 250, Araldite® PY 304, Araldite® GY 282 (Huntsman) or D.E.R.• 331 or D.E.R.™ 330 (Dow), or Epikote 828 (Hexion).

It is preferable that the epoxy resin A is a liquid epoxy resin of the formula (XI). In an embodiment to which even more preference is given, the heat-curing epoxy resin composition comprises at least one liquid epoxy resin of the formula (XI) but also at least one solid epoxy resin of the formula (I').

The proportion of epoxy resin A is preferably from 10 to 85% by weight, in particular from 15 to 70% by weight, with preference from 15 to 60% by weight, based on the weight of the composition.

The hardener B for epoxy resins, where this hardener is activated via increased temperature, is preferably a hardener selected from the group consisting of dicyandiamide, guanamines, guanidines, aminoguanidines, and their derivatives. It is also possible to use accelerating hardeners, e.g. substituted ureas, such as 3-chloro-4-methylphenylurea (chlortoluron), or phenyldimethylureas, in particular p-chlorophenyl-N,N-dimethylurea (monuron), 3-phenyl-1,1-dimethylurea (fenuron) or 3,4-dichlorophenyl-N,N-dimethylurea (diuron). It is also possible to use compounds of the class of the imidazoles and amine complexes.

It is preferable that the hardener B involves a hardener selected from the group consisting of dicyandiamide, guanamines, guanidines, aminoguanidines, and their derivatives; substituted ureas, in particular 3-chloro-4-methylphenylurea (chlortoluron), or phenyldimethylureas, in particular p-chlorophenyl-N,N-dimethylurea (monuron), 3-phenyl-1,1-dimethylurea (fenuron) or 3,4-dichlorophenyl-N,N-dimethylurea (diuron), and also imidazoles and amine complexes.

Dicyandiamide is particularly preferred as hardener B.

The total proportion of the hardener B is advantageously from 0.5 to 12% by weight, preferably from 2 to 8% by weight, based on the weight of the entire composition.

The composition can further comprise an agent C having thixotropic effect, based on a urea derivative. The urea derivative is in particular a reaction product of an aromatic monomeric diisocyanate with an aliphatic amine compound. It is also fully possible that a plurality of different monomeric diisocyanates are reacted with one or more aliphatic amine compounds or that a monomeric diisocyanate is reacted with a plurality of aliphatic amine compounds. The reaction product of diphenylmethylene 4,4'-diisocyanate (MDI) with butylamine has proven particularly advantageous.

The urea derivative is preferably present in a carrier material. The carrier material can be a plasticizer, in particular a phthalate or an adipate, preferably a diisodecyl phthalate (DIDP) or dioctyl adipate (DOA). The carrier can also be a nondiffusing carrier. This is preferred in order to minimize migration of non-reacted constituents after hardening. Capped polyurethane prepolymers are preferred nondiffusing carriers.

The production of these preferred urea derivatives and of carrier materials is described in detail in the patent application EP 1 152 019 A1. The carrier material is advantageously a capped polyurethane prepolymer PU2, in particular obtained via reaction of a trifunctional polyether polyol with IPDI, followed by capping of the terminal isocyanate groups using ε-caprolactam.

The total proportion of the agent C having thixotropic effect is advantageously from 0 to 40% by weight, preferably from 5 to 25% by weight, based on the weight of the entire composition. The ratio of the weight of the urea derivative to the weight of any carrier present is preferably from 2/98 to 50/50, in particular from 5/95 to 25/75.

The composition preferably further comprises a toughener D. Here and hereinafter, a "toughener" is an additive which is used in a reactive matrix and which, even when the amounts added are small, from 0.1 to 15% by weight, in particular from 0.5 to 8% by weight, brings about a marked increase in toughness following curing of the reactive matrix, thus permitting absorption of higher flexural, tensile, or impact stresses before the cured matrix tears or fractures.

The toughener can be a liquid rubber D' or a solid toughener E.

The toughener D is in particular a carboxy- or epoxide-terminated polymer, in particular a carboxy- or epoxide-terminated acrylonitrile/butadiene copolymer, or a derivative thereof, or a block copolymer.

In one first embodiment, the liquid rubber D' is a carboxy- or epoxide-terminated acrylonitrile-butadiene copolymer, or a derivative thereof. Liquid rubbers of this type are commercially available by way of example as Hycar® CTBN and CTBNX and ETBN, from Nanoresins AG, Germany. Particularly suitable derivatives are elastomer-modified prepolymers having epoxy groups, examples being those marketed in the Polydis® product line, preferably in the Polydis® 36. product line, from Struktol® (Schill+Seilacher Group, Germany), or in the Albipox product line (Nanoresins, Germany).

It is naturally clear to the person skilled in the art that it is also possible to use mixtures of liquid rubbers, in particular mixtures of carboxy- or epoxide-terminated acrylonitrile/butadiene copolymers or of derivatives thereof.

In a second embodiment, this liquid rubber D' is a liquid polyacrylate rubber which is completely miscible with liquid epoxy resins and which demixes only during the hardening of the epoxy resin matrix, to give microdroplets. Liquid polyacrylate rubbers of this type are obtainable by way of example as 20208-XPA from Rohm and Haas.

In a third embodiment, the liquid rubber D' is a liquid rubber of the formula (III).

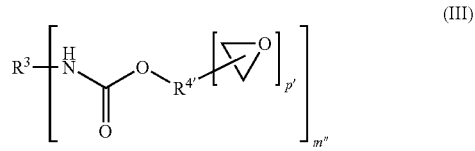

where $R^3$ is a linear or branched polyurethane prepolymer PU1' terminated by m" isocyanate groups, after removal of all of the terminal isocyanate groups, $R^{4'}$ is a moiety of an aliphatic, cycloaliphatic, aromatic, or araliphatic epoxide containing a primary or secondary hydroxy group after removal of the hydroxy and epoxide groups. The detailed possibilities and preferred embodiments for $R^{4'}$ correspond to those for $R^4$, as described above for formula (I) and, respectively, formula (V).

p' is the values 1, 2 or 3. The detailed possibilities and preferred embodiments for p' correspond to those for p, as described above for the formula (I) and, respectively, formula (V).

m" is a value m≧0. The detailed possibilities and preferred embodiments for m" correspond to those for m, as described above for formula (I) and, respectively, formula (IV).

The options and details for the production of the linear or branched polyurethane prepolymer PU1' terminated by isocyanate groups correspond to those described above for the linear or branched polyurethane prepolymer PU1 terminated by isocyanate groups.

In one preferred embodiment, the composition comprises at least one epoxide-functional liquid rubber based on an acrylonitrile/butadiene copolymer and comprises at least one epoxide-functional liquid rubber of the formula (III).

In one first embodiment, the solid toughener E is an organic ion-exchanged laminar mineral E1.

The ion-exchanged laminar mineral E1 can be either a cation-exchanged laminar mineral E1c or an anion-exchanged laminar mineral E1a.

The cation-exchanged laminar mineral E1c here is obtained from a laminar mineral E1' in which at least a portion of the cations have been exchanged for organic cations. Examples of these cation-exchanged laminar minerals E1c are in particular those mentioned in U.S. Pat. No. 5,707,439 or U.S. Pat. No. 6,197,849. Those documents also describe the process for the production of these cation-exchanged laminar minerals E1c. A phyllosilicate is preferred as laminar mineral E1'. The laminar mineral E1' particularly preferably involves a phyllosilicate described in U.S. Pat. No. 6,197,849, column 2, line 38 to column 3, line 5, and particularly involves a bentonite. Laminar minerals E1' such as kaolinite, or a montmorillonite, or a hectorite, or an illite have proven to be particularly suitable.

At least a portion of the cations of the laminar mineral E1' is replaced by organic cations. Examples of cations of this type are n-octylammonium, trimethyldodecylammonium, dimethyldodecylammonium, or bis(hydroxyethyl)octadecylammonium, or similar derivatives of amines which can be obtained from naturally occurring fats and oils; or guanidinium cations, or amidinium cations; or cations of the N-substituted derivatives of pyrrolidine, piperidine, piperazine, morpholine, thiomorpholine; or cations of 1,4-diazobicyclo[2.2.2]octane (DABCO) and 1-azo-bicyclo[2.2.2]octane; or cations of N-substituted derivatives of pyridine, pyrrole, imidazole, oxazole, pyrimidine, quinoline, isoquinoline, pyrazine, indole, benzimidazole, benzoxazole, thiazole, phenazine and 2,2'-bipyridine. Other suitable cations are cyclic amidinium cations, in particular those disclosed in U.S. Pat. No. 6,197,849 in column 3, line 6 to column 4, line 67. Cyclic ammonium compounds feature increased thermal stability in comparison with linear ammonium compounds, since they cannot undergo thermal Hoffmann degradation.

Preferred cation-exchanged laminar minerals E1c are known to the person skilled in the art by the term organoclay or nanoclay, and are commercially available by way of example within the product groups Tixogel® or Nanofil® (Sudchemie), Cloisite® (Southern Clay Products) or Nanomer® (Nanocor Inc.).

The anion-exchanged laminar mineral E1a here is obtained from a laminar mineral E1" in which at least a portion of the anions has been exchanged for organic anions. Examples of this type of anion-exchanged laminar mineral E1a is a hydrotalcite E1" in which at least a portion of the carbonate anions of the intermediate layers has been exchanged for organic anions. A further example is provided by functionalized aluminoxanes, as described by way of example in U.S. Pat. No. 6,322,890.

It is certainly also possible that the composition simultaneously comprises a cation-exchanged laminar mineral E1c and an anion-exchanged laminar mineral E1a.

In a second embodiment, the solid toughener is a block copolymer E2. The block copolymer E2 is obtained from an anionic or controlled free-radical polymerization reaction of methacrylic ester with at least one further monomer having an olefinic double bond. Monomers particularly preferred as those having an olefinic double bond are those in which the double bond has direct conjugation with a heteroatom or with at least one further double bond. Particularly suitable monomers are those selected from the group consisting of styrene, butadiene, acrylonitrile, and vinyl acetate. Preference is given to acrylate-styrene-acrylic acid (ASA) copolymers, obtainable by way of example as GELOY 1020 from GE Plastics.

Particularly preferred block copolymers E2 are block copolymers composed of methyl methacrylate, styrene, and butadiene. Block copolymers of this type are obtainable by way of example in the form of triblock copolymers in the SBM product group from Arkema.

In a third embodiment, the solid toughener E is a core-shell polymer E3. Core-shell polymers are composed of an elastic core polymer and of a rigid shell polymer. Core-shell polymers that are particularly suitable are composed of a core of elastic acrylate polymer or of elastic butadiene polymer, with a surrounding rigid shell of a rigid thermoplastic polymer. This core-shell structure either forms spontaneously via demixing of a block copolymer, or is the inevitable result of using a latex or suspension-polymerization method for the polymerization reaction, with subsequent grafting. Preferred core-shell polymers are those known as MBS polymers, which are available commercially as Clearstrength™ from Atofina, Paraloid™ from Rohm and Haas, or F-351™ from Zeon.

Particular preference is given to core-shell polymer particles present in the form of dried polymer latex. Examples of these are GENIOPERL M23A from Wacker having polysiloxane core and acrylate shell, radiation-crosslinked rubber particles from the NEP line, produced by Eliokem, or Nanoprene from Lanxess, or Paraloid EXL from Rohm and Haas.

Other comparable examples of core-shell polymers are supplied as Albidur™ from Nanoresins AG, Germany.

In a fourth embodiment, the solid toughener E is a solid reaction product E4 of a carboxylated solid nitrile rubber with excess epoxy resin.

Core-shell polymers are preferred as solid toughener E.

The composition advantageously comprises an amount of from 1 to 25% by weight of the toughener D, based on the weight of the composition.

In another preferred embodiment, the composition also comprises at least one filler F. This preferably involves mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminum hydroxide, magnesium oxide, thermoplastic polymer powders, such as polyamide or poly(methyl methacrylate), hollow ceramic beads, hollow or solid glass beads, hollow organic beads, color pigments, and fibers. Particularly suitable fibers are long fibers or short chopped glass fibers, carbon fibers, polyacrylonitrile fibers, or phenolic resin fibers. thermoplastic polymer powders, such as polyamide or poly(methyl methacrylate), hollow ceramic beads, hollow or solid glass beads, hollow organic beads, color pigments, and fibers.

Filler F means both the organically coated and the uncoated forms which are commercially available and known to the person skilled in the art.

The total proportion of the entire filler F is advantageously from 3 to 50% by weight, preferably from 5 to 35% by weight, in particular from 5 to 25% by weight, based on the weight of the entire composition.

In a particularly preferred embodiment, the composition comprises a physical or chemical blowing agent, for example one available with trademark Expancel™ from Akzo Nobel or Celogen™ from Chemtura. The proportion of the blowing agent is advantageously from 0.1 to 3% by weight, based on the weight of the composition.

In another preferred embodiment, the composition also comprises at least one reactive diluent G bearing epoxide groups. These reactive diluents G in particular involve:
- glycidyl ethers of monohydric saturated or unsaturated, branched or unbranched, cyclic or open-chain $C_4$-$C_{30}$ alcohols, e.g. butanol glycidyl ether, hexanol glycidyl ether, 2-ethylhexanol glycidyl ether, allyl glycidyl ether, tetrahydrofurfuryl glycidyl ether, and furfuryl glycidyl ether, trimethoxysilyl glycidyl ether, etc.,
- glycidyl ethers of dihydric saturated or unsaturated, branched or unbranched, cyclic or open-chain $C_2$-$C_{30}$ alcohols, e.g. ethylene glycol glycidyl ether, butanediol glycidyl ether, hexanediol glycidyl ether, octanediol glycidyl ether, cyclohexanedimethanol diglycidyl ether, neopentyl glycol diglycidyl ether, etc.,
- glycidyl ethers of tri- or polyhydric, saturated or unsatured, branched or unbranched, cyclic or open-chain alcohols, e.g. epoxidized castor oil, epoxidized trimethylolpropane, epoxidized pentaerythritol, or polyglycidyl ethers of aliphatic polyols, such as sorbitol, glycerol, trimethylolpropane, etc.,
- glycidyl ethers of phenol compounds and of aniline compounds, e.g. phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline, etc.,
- epoxidized amines, such as N,N-diglycidylcyclohexylamine, etc.,
- epoxidized mono- or dicarboxylic acids, e.g. glycidyl neodecanoate, glycidyl methacrylate, glycidyl benzoate, diglycidyl phthalate, diglycidyl tetrahydrophthalate, diglycidyl hexahydrophthalate, diglycidyl esters of dimeric fatty acids, etc.,
- epoxidized di- or trihydric, low- to high-molecular-weight polyether polyols, e.g. polyethylene glycol diglycidyl ether, polypropylene glycol diglycidyl ether, etc.

Particular preference is given to hexanediol diglycidyl ether, cresyl glycidyl ether, p-tert-butylphenyl glycidyl ether, polypropylene glycol diglycidyl ether, and polyethylene glycol diglycidyl ether.

The total proportion of the reactive diluent G bearing epoxide groups is advantageously from 0.5 to 20% by weight, preferably from 1 to 8% by weight, based on the weight of the entire composition.

The composition can encompass further constituents, in particular catalysts, heat stabilizers and/or light stabilizers, agents with thixotropic effects, plasticizers, solvents, mineral or organic fillers, blowing agents, dyes, and pigments.

The compositions can be used particularly as single-component adhesives. The invention also provides a use of the above-described composition as single-component heat-curing adhesive. This type of single-component adhesive has a wide range of possible applications. In particular, it is possible here to realize heat-curing single-component adhesives which feature high impact resistance, not only at relatively high temperatures but also particularly at low temperatures, in particular at from 0° C. to −40° C. Adhesives of this type are needed for the adhesive bonding of heat-resistant materials. Heat-resistant materials are materials which are dimensionally stable at a hardening temperature of from 100 to 220° C., preferably from 120 to 200° C., at least during the hardening time. These materials in particular involve metals and plastics such as ABS, polyamide, polyphenylene ether, composite materials, such as SMC, unsaturated GF-reinforced polyesters, and epoxy composite materials or acrylate composite materials. Preference is given to the application in which at least one material is a metal. A particularly preferred application is the adhesive bonding of identical or different metals, in particular in bodyshell construction in the automobile industry. The preferred metals are particularly steel, in particular electrolytically galvanized or hot-dip galvanized or oiled steel, or Bonazinc-coated steel, and subsequently phosphated steel, and also aluminum, in particular in the variants occurring typically in automobile construction.

An adhesive based on a composition of the invention permits achievement of the desired combination of high crash strength together with both high and low usage temperature. In addition to this, the composition has a high level of mechanical properties. In particular, it has been found that glass transition temperatures above 95° C. can be achieved, in particular 100° C. or above, and this is particularly important for applications with high operating temperatures.

A further aspect of the invention therefore provides a process for the adhesive bonding of heat-resistant materials, by bringing said materials into contact with an epoxy resin composition described above, where the process encompasses one or more steps of hardening at a temperature of from 100 to 220° C., preferably from 120 to 200° C. This type of adhesive is in particular first brought into contact at a temperature of from 10° C. to 80° C., in particular from 10° C. to 60° C., with the materials to be adhesive-bonded, and is subsequently hardened at a temperature which is typically from 100 to 220° C., preferably from 120 to 200° C.

A further aspect of the present invention relates to an adhesive-bonded item which is obtained via an adhesive-bonding process using a composition described above and heating of the adhesive-bonded materials to a temperature of from 100 to 220° C., preferably from 120 to 200° C.

This item is preferably a vehicle or an add-on part of a vehicle.

A composition of the invention can, of course, be used to realize not only heat-curing adhesives but also sealing compositions or coatings. The compositions of the invention are moreover suitable not only for automobile construction but also for other application sectors. Particular mention may be made of related applications in the construction of means of conveyance such as ships, trucks, buses, or rail vehicles, or in the construction of consumer goods, such as washing machines.

The materials adhesive-bonded by means of a composition of the invention are used at temperatures which are typically from 120° C. to −40° C., preferably from 100° C. to −40° C., in particular from 80° C. to −40° C.

It has been found that the derivatized solid epoxy resin of the formula (I) can give excellent results when used as impact modifier, i.e. as means for improving impact resistance, in particular in epoxy resins.

One particularly preferred application of the heat-curing epoxy resin composition of the invention is the application as heat-curing bodyshell adhesive in vehicle construction.

The particularly preferred compositions which comprise a blowing agent can be used as structural foam for reinforcement, and also for sound-deadening of cavities, in particular of metallic structures. The blowing agent is provided in an amount of from 0.1 to 3% by weight, based on the weight of the composition. These cavities are in particular cavities of means of transport, preferably of automobiles, buses, trucks, or rail vehicles. These metallic structures which have cavities requiring filling are in particular load-bearing metal structures, for example A-, B-, or C- columns, or sills of automobiles.

The composition is in particular applied into the cavity prior to electrophoretic coating. It then foams and crosslinks subsequently in the coating oven at temperatures of from 100 to 220° C., preferably from 120 to 200° C.

A further aspect of the invention therefore provides foamed items which are obtained via at least partial filling of a cavity with a composition described above, and heating of the adhesive-bonded materials to a temperature of from 100 to 220° C., preferably from 120 to 200° C.

Said foamed item is in particular a vehicle or an add-on part of a vehicle.

Examples

Some examples will be indicated below, providing further illustration of the invention, but not in any way intended to restrict its scope.

Example of Production of a Monohydroxylated Epoxide
Monohydroxylated Epoxide MHE1

Trimethylolpropane glycidyl ether was produced by the process in U.S. Pat. No. 5,668,227, example 1, starting from trimethylolpropane and epichlorohydrin, using tetramethylammonium chloride and sodium hydroxide solution. The product is yellowish, with an epoxy number of 7.5 eq/kg and with hydroxy group content of 1.8 eq/kg. The HPLC MS spectrum indicates that it is in essence a mixture of trimethylolpropane diglycidyl ether and trimethylolpropane triglycidyl ether. This product was used as ME1.

Monohydroxylated Epoxide MHE2

1,3-bis(4-(2-(4-(oxiran-2-ylmethoxy)phenyl)propan-2-yl)phenoxy)propan-2-ol):

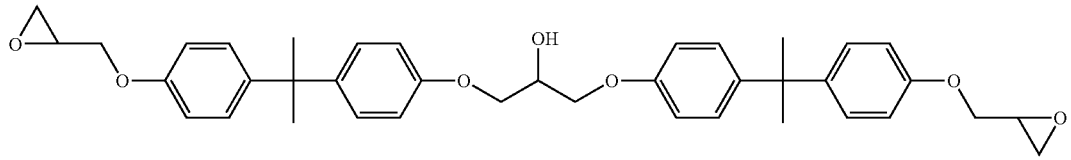

This corresponds to the compound of the formula (IX) in which R is methyl. 1,3-bis(4-(2-(4-(oxiran-2-yl-methoxy)phenyl)propan-2-yl)phenoxy)propan-2-ol) was obtained from technical-grade bisphenol A diglycidyl ether (DGEBA) (Araldite® GY 250, producer Huntsman), in which it is present to an extent of about 15% by weight. It can be concentrated by distillative removal of DGEBA. Technical-grade bisphenol A diglycidyl ether (EEW=195 g/epoxide equivalent, determined via titration) is fed at 200 ml/h by a membrane pump into a thin-film evaporator (producer: Ilmag) under the vacuum provided by an oil pump, using a heating-mantle temperature of 180° C. Pure DGEBA is removed by distillation during this process and crystallizes at room temperature. The residual bottom product has EEW=207.1 g/epoxide equivalent. Using THF as solvent, the GPC plot has a ratio of 40:60 for the peaks of "DGEBA dimer" and DGEBA. This product was used as MHE2.

Example of a Polyurethane Prepolymer: PU1-1

400 g of PolyTHF 2000 (OH number 57.5 mg/g of KOH) (BASF) were dried at 100° C. in vacuo for 30 minutes. 93.9 g of IPDI and 0.04 g of dibutyltin dilaurate were then added. The reaction was conducted at 90° C. in vacuo until NCO content was constant at 3.58%, after 2.5 h (theoretical NCO content: 3.70%).

The polyurethane prepolymers PU1-2, PU1-3, and PU1-4 were produced by analogy with PU1-1 from the diols, triol, and diisocyanates as in table 1. For PU1-4, a diol/triol mixture was used as starting material.

TABLE 1

Production of examples of polyurethane prepolymers.

| | Diol | Triol | Diisocyanate |
|---|---|---|---|
| PU1-1 | 400 g D1[1] | | 93.9 g IPDI |
| PU1-2 | 300 g D1[1] | | 71.3 g IPDI |
| PU1-3 | 264.8 g D2[2] | | 35.15 g MDI |
| PU1-4 | 148.16 g D2[2] | 296.31 g T1[3] | 55.53 g IPDI |

[1]D1 = polybutylene oxide diol (OH number: 57.5 mg/g of KOH, OH equivalent weight: about 1000 g/OH eq.) (PolyTHF 2000, BASF)
[2]D2 = polypropylene oxide diol (OH number: 28.1 mg/g of KOH, OH equivalent weight: about 2000 g/OH eq.)
[3]T1 = polypropylene oxide triol (OH number: 31.2 mg/g of KOH, OH equivalent weight: about 1800 g/OH eq.)

Example of a Partially Capped Polyurethane Prepolymer: TBP-1

173.7 g of the monohydroxylated epoxide MHE1 described above were then added to the 493.94 g of polyurethane prepolymer PU1-1 described above. Stirring was continued in vacuo at 90° C. until NCO content remained constant at 0.69% NCO, after a further 3 h.

The partially capped polyurethane prepolymers TBP-1, TBP-2, TBP-3, TBP-4, and TBP-5 were produced by analogy with TBP-1 from the polyurethane prepolymers and the capping agents as in table 2.

TABLE 2

Production of examples of partially capped polyurethane prepolymers of the formula (V).

| | Polyurethane prepolymer | Capping agent | NCO content |
|---|---|---|---|
| TBP-1 | 493.94 g PU1-1 | 173.7 g MHE1 | 0.69% |
| TBP-2 | 299.99 g PU1-3 | 184.7 g MHE2 | 0.34% |
| TBP-3 | 299.99 g PU1-3 | 30.5 g NC700[1] | 0.49% |
| TBP-4 | 500.04 g PU1-4 | 249.8 g MHE2 | 0.70% |

[1]NC700 = Cardolite NC700 (cardanol, meta-substituted alkenylmonophenol) (Cardolite)

Example of a Derivatized Solid Epoxy Resin: 1

The partially capped polyurethane prepolymer was reacted as follows in an extruder with the hydroxy groups of a solid epoxy resin:

In a twin-screw extruder (L/D 40, screw diameter 25 mm, producer OMC, Italy) with nine heating zones, Araldite® GT 7004 solid epoxy resin (Huntsman) (produced via advancement reaction of bisphenol A diglycidyl ether with bisphenol A, epoxide equivalent weight 735 g/epoxide equivalent) was extruded at 90° C. and 450 rpm. The mass flow was 2.640 kg/h. The partially capped polyurethane prepolymer TBP-1, heated to 90° C., was fed at 660 ml/h into heating zone 4 by way of a liquid feed system. Passage through a cooled two-roll calender gave the derivatized solid epoxy resin 1 in the form of solid brittle sheets, which were comminuted in an impact mill.

The derivatized solid epoxy resins 2, 3, 4, and 5 were produced by analogy with 1 from the partially capped polyurethane prepolymers and the solid resins as in table 3.

TABLE 3

Production of examples of derivatized solid epoxy resins of the formula (I)

| | Partially capped polyurethane prepolymer | Solid epoxy resin |
|---|---|---|
| 1 | TBP-1 | Araldite ® GT 7004 (epoxide equivalent weight 735 g/epoxide equivalent) |
| 2 | TBP-2 | Araldite ® GT 7071 (epoxide equivalent weight 500 g/epoxide equivalent) |
| 3 | TBP-3 | Araldite ® GT 7004 |
| 4 | TBP-4 | Araldite ® GT 7071 |
| 5 | TBP-4 | Araldite ® GT 7004 |

Examples of Compositions

Adhesives

Adhesive compositions Z1 to Z7 were produced as in table 4. All of the components other than dicyandiamide were used as initial charge in a planetary-gear mixer and mixed for one hour in vacuo at from 90 to 100° C., and then drawn off into cartridges. The tests described were used for testing of mechanical properties.

Test Methods:

Tensile Shear Strength (TSS) (DIN EN 1465)

The test specimens were produced from the compositions described, and using electrolytically galvanized DC04 steel (elozn) with dimensions 100×25×1.5 mm, the adhesive area being 25×10 mm, with layer thickness 0.3 mm. Curing was carried out for 30 min. at 180° C. The tensile testing rate was 10 mm/min.

Tensile Strength (TS)/Elongation at Break (EB)/Modulus of Elasticity (DIN EN ISO 527)

A specimen of adhesive was pressed to a layer thickness of 2 mm between two Teflon papers. The adhesive was then cured for 30 minutes at 180° C. The Teflon papers were removed, and the test specimens in accordance with the DIN standard were stamped out while hot. The test specimens were stored for 1 day under standard conditions of temperature and humidity and then tested using a tensile testing rate of 2 mm/min.

Tensile strength, elongation at break, and modulus of elasticity (0.05-0.25%) were determined to DIN EN ISO 527.

Cleavage Under Dynamic Load (ISO 11343)

The test specimens were produced from the compositions described, using electrolytically galvanized DC04 steel (elozn) with dimensions 90×20×0.8 mm, the adhesive area being 20×30 mm, with a layer thickness of 0.3 mm. They were cured at 180° C. for 30 min. Cleavage under dynamic load was in each case measured at room temperature and at −20° C. The dynamic rate was 2 m/s. The area under the test curve (from 25% to 90%, to ISO 11343) is stated as fracture energy (FE) in joules.

Table 4 collates the results of these tests.

TABLE 4

Compositions and results.

|  | Z1 | Z2 | Z3 | Z4 | Z5 | Z6 | Z7 |
|---|---|---|---|---|---|---|---|
| DGBEA[1] [pbw[2]] | 50 | 50 | 100 | 100 | 60 | 140 | 140 |
| Struktol[3] [pbw[2]] |  |  | 100 | 100 | 100 | 100 | 100 |
| 1 [pbw[2]] |  |  |  | 140 |  | 60 |  |
| 2 [pbw[2]] | 175 |  |  |  |  |  |  |
| 3 [pbw[2]] |  |  | 100 |  | 140 |  | 60 |
| 4 [pbw[2]] |  | 175 |  |  |  |  |  |
| Dicyandiamide [pbw[2]] | 9.6 | 8.4 | 11.9 | 11.1 | 9.2 | 15.8 | 14.8 |
| Filler mixture [pbw[2]] | 85 | 85 | 45 | 45 | 45 | 45 | 45 |
| Modulus of elasticity [MPa] | 1920 | 1802 | 1872 | 1902 | 1328 | 1884 | 1777 |
| TS [MPa] | 47.1 | 35.5 | 40.2 | 42.4 | 28.0 | 46.2 | 40.8 |
| EB [%] | 7.2 | 3.5 | 6.1 | 8.5 | 5.8 | 7.4 | 5.4 |
| TSS [MPa] | 24.9 | 22.4 | 30.0 | 29.1 | 22.7 | n.m.[5] | n.m.[5] |
| FE[4] at 23° C. [J] | 12.2 | 15.4 | 11.5 | 17.2 | 10.5 | 14.1 | 14.2 |
| FE[4] at −20° C. [J] | 9.7 | 11.9 | n.m.[5] | 7.1 | n.m.[5] | n.m.[5] | n.m.[5] |

[1]DGEBA = D.E.R. 330 (Dow) (liquid epoxy resin)
[2]pbw = parts by weight
[3]Struktol = Struktol ® Polydis ® VP-3611 (bisphenol F diglycidyl ether, modifier nitrile-butadiene rubber (EEW = 560 g/eq) (Schill & Seilacher)
[4]FE = Fracture energy
[5]n.m. = not measured.

Structural Foams

Structural foams were produced using the composition as in table 5. The solid ingredients here, in the form of granules, were homogenized by way of a solids-feed system in zone 1 in a twin-screw extruder (L/D 40, screw diameter 25 mm, producer OMC, Italy) with nine heating zones, cooled slot die, and cooled two-roll calender, to give granules which could be injected molded. Typical settings were:

Temperatures in zone 1-4: 30, 70, 90, 90, zone 5-9: 90/90/90/85/80° C.

Melt Temperature at Outlet 72° C.

In the case of examples Ref.1 and Ref.2, the high-viscosity liquid rubber EP1 was heated to 80° C. and injected by way of a liquid-feed system into zone 5. EP1 was produced as follows:

Example of Production of a Polyurethane Prepolymer (EP1) Terminated by Epoxide Groups 160 g of PolyTHF 1800 (BASF) (OH number 62.3 m/g of KOH), 110 g of Liquiflex H H (hydroxy-terminated polybutadiene, Krahn) (OH number 46 mg/g of KOH), and 130 g of Caradol ED 56-10 (bifunctional polypropylene glycol, Shell) (OH number: 56 mg/g of KOH) were dried at 105° C. in vacuo for 30 minutes. Once the temperature had been reduced to 90° C., 92.5 g of IPDI and 0.08 g of dibutyltin dilaurate were added. The reaction was conducted at 90° C. in vacuo until NCO content was constant at 3.60%, after 2.5 h (calculated NCO content: 3.62%). 257.8 g of the MHE1 described above were then added to this polyurethane prepolymer, and the reaction was continued in vacuo at 90° C. until there was no residual measurable NCO content.

Test Methods:

Glass Transition Temperature ($T_g$)

Glass transition temperature was determined by means of DSC. Mettler DSC822$^e$ equipment was used for this. From 20 to 30 mg of adhesive sample were in each case weighed into an aluminum crucible. Once the specimen had been cured at 180° C. for 30 min. in the DSC, it was cooled to −20° C. and then heated up to 150° C. at a heating rate of 20° C./min. Glass transition temperature was determined from the measured DSC curve, with the aid of the DSC software.

Tensile Strength (TS) (DIN EN ISO 527)

A specimen of adhesive was pressed to a layer thickness of 2 mm between two Teflon papers. The adhesive was then cured for 30 minutes at 180° C. The Teflon papers were removed, and the test specimens in accordance with the DIN standard were stamped out while hot. The test specimens were stored for 1 day under standard conditions of temperature and humidity and then tested using a tensile testing rate of 2 mm/min.

Tensile strength, elongation at break, and modulus of elasticity (0.05-0.25%) were determined to DIN EN ISO 527.

3-Point Bending (ISO 178)

The test specimens were subjected to a 3-point bending test to ISO 178. This test gives the flexural stress ("FS"), bending modulus (in the range from 0.05 to 0.25%) ("BM"), and also the maximum deflection "$d_{max}$".

The results of these tests are collated in table 5.

TABLE 5

Examples of structural foam compositions and test results therefrom.

|  | Ref. 1 | Ref. 2 | SF1 | SF2 | SF3 | SF4 | SF5 | SF6 |
|---|---|---|---|---|---|---|---|---|
| GT 7004[1] [pbw[2]] | 53.1 | 55.3 | 53.4 | 55.7 | 51.9 | 54.4 | 51.9 | 54.4 |
| Nipol[3] [pbw[2]] | 8.6 | 7.3 | 8.6 | 7.3 | 8.6 | 7.3 | 8.6 | 7.3 |
| 1 [pbw[2]] |  |  |  |  | 8.6 | 7.3 |  |  |
| 3 [pbw[2]] |  |  | 7 | 5.9 |  |  |  |  |
| 5 [pbw[2]] |  |  |  |  |  |  | 8.6 | 7.3 |
| EP1 [pbw[2]] | 7.4 | 6.3 |  |  |  |  |  |  |

TABLE 5-continued

Examples of structural foam compositions and test results therefrom.

|  | Ref. 1 | Ref. 2 | SF1 | SF2 | SF3 | SF4 | SF5 | SF6 |
|---|---|---|---|---|---|---|---|---|
| Dicyandiamide [pbw²] | 1.2 | 1.4 | 1.3 | 1.4 | 1.2 | 1.3 | 1.2 | 1.3 |
| Kevlar fibers [pbw²] | 1.4 | 1.4 | 1.4 | 1.4 | 1.4 | 1.4 | 1.4 | 1.4 |
| Glass fibers (3 mm) [pbw²] | 3.5 | 3.5 | 3.5 | 3.5 | 3.5 | 3.5 | 3.5 | 3.5 |
| Aerosil ® R202 [pbw²] | 2.4 | 2.4 | 2.4 | 2.4 | 2.4 | 2.4 | 2.4 | 2.4 |
| Calcium carbonate [pbw²] | 10.4 | 10.4 | 10.4 | 10.4 | 10.4 | 10.4 | 10.4 | 10.4 |
| Glass fiber (ground) [pbw²] | 10.4 | 10.4 | 10.4 | 10.4 | 10.4 | 10.4 | 10.4 | 10.4 |
| Expancel 95DU120⁴ [pbw²] | 1.6 | 1.6 |  | 1.6 | 1.6 | 1.6 | 1.6 | 1.6 |
| $T_g$ [° C.] | 95 | 99 | 96 | 99 | 91 | 99 | 107 | 108 |
| TS [MPa] | 19.9 | 11.8 | 9.7 | 10.1 | 8.4 | 9.8 | 8.7 | 5.3 |
| Modulus of elasticity [MPa] | 1096 | 848 | 865 | 945 | 759 | 846 | 502 | 591 |
| FS [MPa] | 19.3 | 18.5 | 16.1 | 14.6 | 24.1 | 13.4 | 15.6 | 11.8 |
| BM [MPa] | 1061 | 681 | 858 | 802 | 757 | 496 | 638 | 558 |
| $d_{max}$ [mm] | 2.6 | 3.1 | 2.3 | 2.2 | 3.5 | 2.1 | 4.9 | 2.5 |

¹GT 7004 = Araldite ® GT 7004 (Huntsman)
²pbw = parts by weight
³Nipol = Nipol 1472 (Zeon, granules of a high-molecular-weight solid carboxylated nitrile rubber).
⁴Expancel 95DU120 is a blowing agent, producer Akzo.

What is claimed is:

1. A derivatized solid epoxy resin of formula (I)

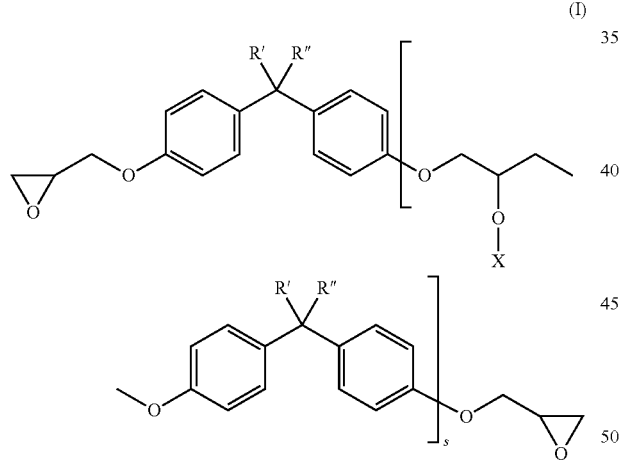

where each R' and R" is independently H or CH₃;
each X is independently H or a moiety of formula (II)

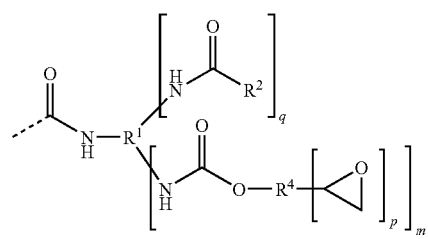

where R¹ is a structural portion of a linear or branched polyurethane prepolymer PU1 terminated by an uncapped isocyanate group and (m+q) capped isocyanate groups, excluding the terminal uncapped and capped isocyanate groups;

each R² is independently a capping group which cleaves at a temperature above 100° C.;

R⁴ is a structural portion of a monohydroxyl epoxy compound having p epoxy groups and a single primary or secondary hydroxyl group, excluding the epoxy groups and the primary or secondary hydroxyl group, wherein R⁴ is structurally aliphatic, cycloaliphatic, aromatic, or araliphatic;

p=1, 2, or 3;

m≧0, and q≧0, with the condition that 1 ≦(m+q) ≦8;

s is a value from 2 to 12;

wherein at least one X in formula (I) is a moiety of formula (II).

2. The derivatized solid epoxy resin of claim 1, wherein in formula (I), at least one X is H and at least one X is a moiety of formula (II).

3. The derivatized solid epoxy resin of claim 2, wherein at most 90% of all of the X moieties are a moiety of formula (II).

4. The derivatized solid epoxy resin of claim 1, wherein R² is a moiety selected from the group consisting of

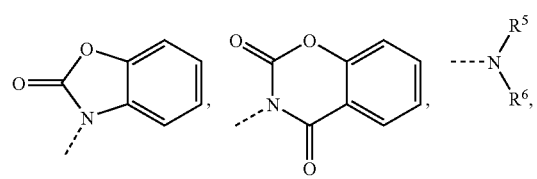

-continued

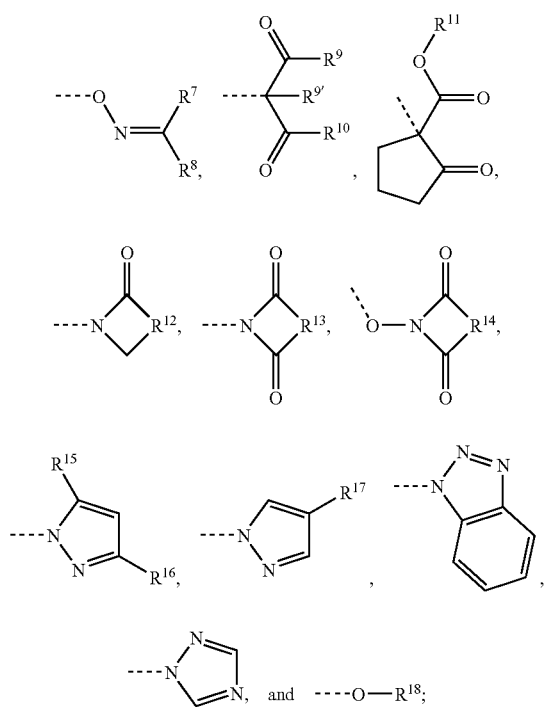

where
- each $R^5$, $R^6$, $R^7$ and $R^8$ is independently an alkyl group, a cycloalkyl group, an aryl group, an aralkyl group or an arylalkyl group; and alternatively $R^5$ together with $R^6$ or $R^7$ together with $R^8$ form a portion of an optionally substituted 4- to 7-membered ring;
- each $R^9$, $R^{9\prime}$, and $R^{10}$ is independently an alkyl group, an aralkyl group, an aryl group, an arylalkyl group, an alkyloxy group, an aryloxy group or an aralkyloxy group;
- $R^{11}$ is an alkyl group,
- each $R^{12}$, $R^{13}$, and $R^{14}$ is independently an alkylene group having from 2 to 5 carbon atoms and optionally having double bonds or substitution, a phenylene group, or a hydrogenated phenylene group;
- each $R^{15}$, $R^{16}$, and $R^{17}$ is independently H or an alkyl group; and
- $R^{18}$ is an aralkyl group, a substituted aromatic group or an unsubstituted aromatic group, wherein the aromatic groups optionally feature hydroxy groups.

5. The derivatized solid epoxy resin of claim 1, wherein $R^2$ is a structural portion of a monophenol or polyphenol, excluding the hydrogen atom of one hydroxyl group.

6. The derivatized solid epoxy resin of claim 1, wherein m>0.

7. The derivatized solid epoxy resin of claim 6, wherein q=0.

8. The derivatized solid epoxy resin of claim 1, wherein m+q =1.

9. The derivatized solid epoxy resin of claim 1, wherein the monohydroxyl epoxy compound having p epoxy groups and a single primary or secondary hydroxyl group is selected from the group consisting of butanediol monoglycidyl ether, hexanediol monoglycidyl ether, trimethylolpropane diglycidyl ether, glycerol diglycidyl ether, pentaerythritol triglycidyl ether, glycidol, 3-glycidyloxybenzyl alcohol, hydroxymethylcyclohexene oxide, and 1,3-bis(4-(2-(4-oxiran-2-yl-methoxy)phenyl)propan-2-yl) phenoxy)propan-2-ol).

10. The derivatized solid epoxy resin of claim 1, wherein the polyurethane prepolymer PU1 is produced from:
- at least one diisocyanate or triisocyanate; and
- at least one of a polymer $Q_{PM}$ having terminal amino, thiol, or hydroxy groups and an optionally substituted polyphenol $Q_{PP}$.

11. The derivatized solid epoxy resin of claim 10, wherein the polymer $Q_{PM}$ has 2 or 3 terminal amino, thiol, or hydroxy groups.

12. The derivatized solid epoxy resin of claim 10, wherein the polymer $Q_{PM}$ is an α,ω-dihydroxypolyalkylene glycol having $C_2$-$C_6$-alkylene groups or having mixed $C_2$-$C_6$-alkylene groups and terminated with amino groups, thiol groups or hydroxy groups.

13. The derivatized solid epoxy resin of claim 10, wherein the polymer $Q_{PM}$ is a hydroxylated polybutadiene, a hydroxyl-containing polyisoprene or their partially or completely hydrogenated reaction products.

14. The derivatized solid epoxy resin of claim 10, wherein the polymer $Q_{PM}$ has an OH-equivalent weight of from 300 to 6000 g/OH-equivalent.

15. The derivatized solid epoxy resin of claim 10, wherein the polyphenol $Q_{PP}$ has 2 or 3 phenolic groups.

16. The derivatized solid epoxy resin of claim 10, wherein the polyurethane prepolymer PU1 is produced from:
- at least one diisocyanate; and
- at least one of a polymer $Q_{PM}$ having terminal amino, thiol, or hydroxy groups and an optionally substituted polyphenol $Q_{PP}$.

17. A process for producing the derivatized solid epoxy resin of claim 1 comprising:
- forming a partially capped polyurethane prepolymer of formula (IV) by reacting a linear or branched polyurethane prepolymer PU1 terminated by isocyanate groups with a compound $R^2H$ and/or a compound of formula (V)

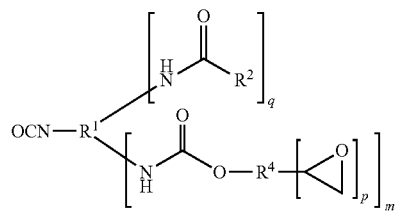

(IV)

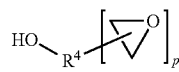

(V)

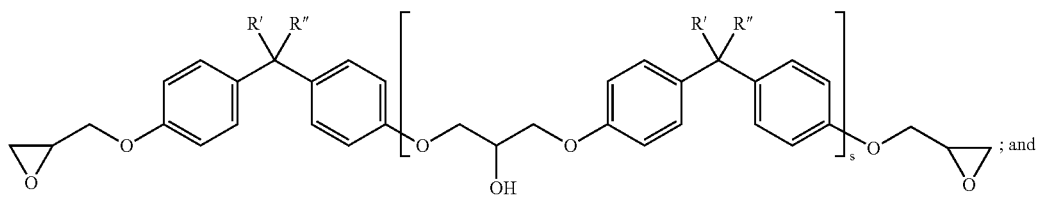
(I')

reacting the partially capped polyurethane prepolymer of formula (IV) with a solid resin of formula (I'), yielding the derivatized solid epoxy resin of formula (I).

18. A method of improving impact resistance of a composition, comprising: providing the derivatized solid epoxy resin of claim 1 in said composition.

19. A composition comprising the derivatized solid epoxy resin of claim 1.

20. The composition of claim 19, wherein the proportion of the derivatized solid epoxy resin is from 5 to 60% by weight, based on the weight of the composition.

21. The composition of claim 19, further comprising:
at least one epoxy resin A having an average of more than one epoxide group per molecule;
at least one hardener B for epoxy resins, where this hardener is activated via increased temperature.

22. The composition of claim 21, further comprising a toughener D, wherein the toughener D is a carboxy- or epoxide- terminated polymer in an amount of from 1 to 25% by weight, based on the weight of the composition.

23. The composition of claim 21, further comprising at least one filler F in an amount of from 3 to 50% by weight, based on the weight of the composition.

24. The composition of claim 21, further comprising a reactive diluent G bearing epoxide groups, where the amount of this diluent is from 0.5 to 20% by weight, based on the weight of the composition.

25. The composition of claim 21, wherein the epoxy resin composition is solid at room temperature.

26. A method of heat-curing, comprising: providing the composition of claim 21, and increasing temperature to activate the hardener B.

27. An adhesive-bonded item obtained by bonding materials with the composition of claim 21, and heating the bonded materials to a temperature of from 100 to 220° C.

28. The adhesive-bonded item of claim 27, wherein the item is a vehicle or an add-on part of a vehicle.

29. The composition of claim 21, further comprising at least one blowing agent in an amount of from 0.1 to 3% by weight, based on the weight of the composition.

30. A method of reinforcing cavities, comprising: providing the composition of claim 29, and filling said cavities with the composition.

31. A foamed item obtained by at least partially filling a cavity with the composition of claim 29, and heating the filled cavity to a temperature of from 100 to 220° C.

32. The foamed item of claim 31, wherein the item is a vehicle or an add-on part of a vehicle.

* * * * *